(12) United States Patent
Totsu (10) Patent No.: US 6,393,953 B1
(45) Date of Patent: May 28, 2002

(54) COMBINATION OF SCREW WITH DRIVER BIT OR WRENCH

(76) Inventor: Katsuyuki Totsu, 32-13, Oshiage 1-Chome, Sumida-ku, Tokyo (JP)

(*) Notice: Subject to any disclaimer, the term of this patent is extended or adjusted under 35 U.S.C. 154(b) by 0 days.

(21) Appl. No.: 09/581,135
(22) PCT Filed: Dec. 9, 1998
(86) PCT No.: PCT/JP98/05575
§ 371 (c)(1),
(2), (4) Date: Jun. 9, 2000
(87) PCT Pub. No.: WO99/30046
PCT Pub. Date: Jun. 17, 1999

(30) Foreign Application Priority Data

Dec. 10, 1997 (JP) .............................................. 9-340321

(51) Int. Cl.[7] .............................................. B25B 23/10
(52) U.S. Cl. ............................. 81/452; 81/460; 411/403
(58) Field of Search ......................... 81/436, 451, 452, 81/460; 411/403, 410

(56) References Cited

U.S. PATENT DOCUMENTS 3,888,144 A * 6/1975 Parsons .................... 81/451 X
3,894,450 A * 7/1975 Hill et al. ................ 81/460 X
5,207,132 A * 5/1993 Goss et al. ............... 81/460 X

FOREIGN PATENT DOCUMENTS

| JP | 48-76348 | 9/1973 |
| JP | 50-15897 | 2/1975 |
| JP | 60-131715 | 9/1985 |
| JP | 8-145024 | 6/1996 |

* cited by examiner

Primary Examiner—James G. Smith
(74) Attorney, Agent, or Firm—Finnegan, Henderson, Farabow, Garrett & Dunner, L.L.P.

(57) ABSTRACT

A screw with a polygonal hole (30) formed with a polygonal hole (32) disposed in the center of a screw head (30a) and comprising a vertical wall (33) with a preset depth, and with a cone base oriented from the lower edge of the vertical wall toward the center of a screw neck, wherein a vertical step forming an inscribed circle of the polygon is provided at the lower edge (33a) of the vertical wall (33) of the polygonal hole (32) formed in the screw head (30a), the cone base (35) oriented from the lower edge (34a) of the vertical step (34) toward the center of the screw neck is formed, and a driver bit (40) or wrench (41) to be fitted to this screw is provided at the tip of a peak edge (42) with a cylindrical projection (44) forming the inscribed circle of the polygon.

19 Claims, 7 Drawing Sheets

COMBINATION OF SCREW WITH DRIVER BIT OR WRENCH

TECHNICAL FIELD

The present invention relates to a screw and a driver bit applied thereto, and to a combination of a screw and driver bit/wrench which realizes a tight engagement between an angular hole formed, for example, on a head of a hexagonal recessed screw or bolt and a driver bit provided with a bit tip formed to fit this angular hole, and which is capable of promptly and positively achieving attachment and detachment of the screw or the like by appropriate torque transmission.

BACKGROUND ART

Figure 13:
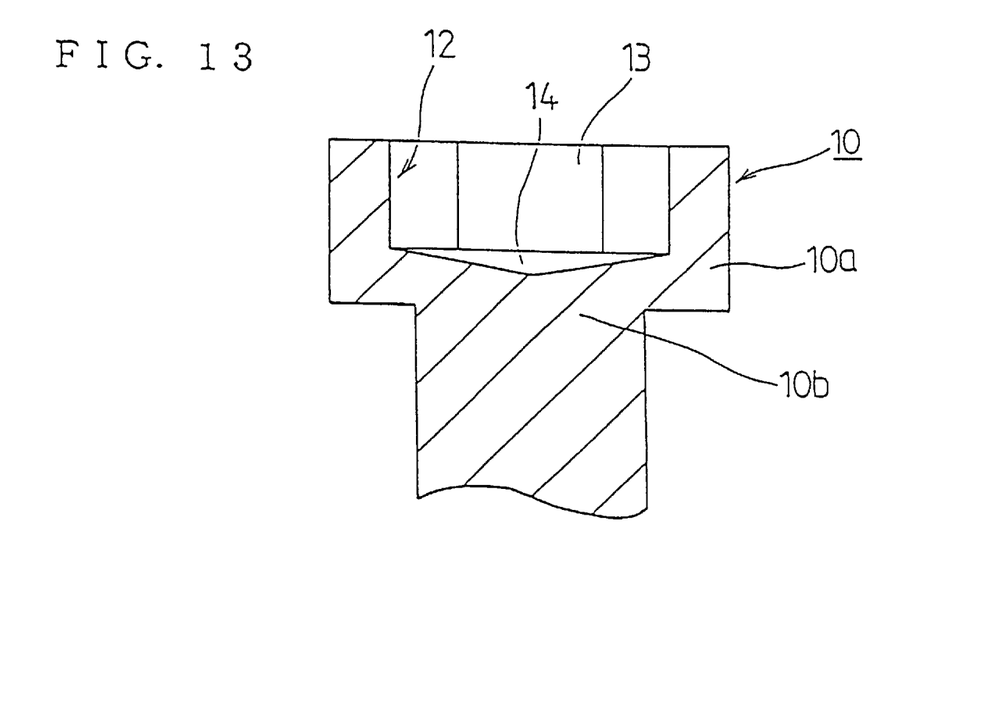
FIG. 13 is a side sectional view of a main portion of a conventional hexagonal recessed bolt.
Figure 14:
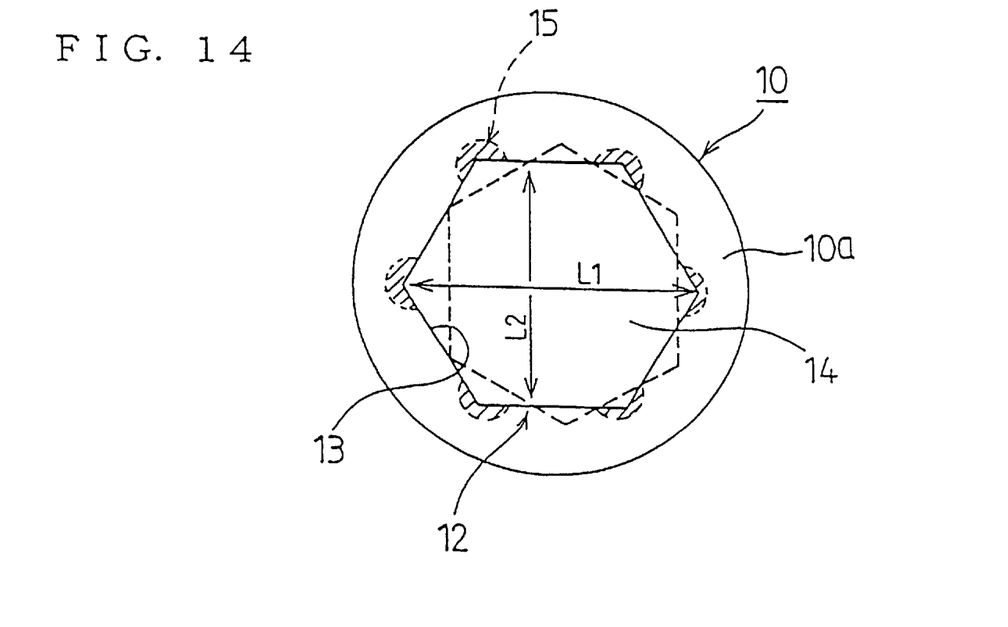
FIG. 14 is a plan of a head portion of the hexagonal recessed bolt indicated in FIG. 13.
Figure 15:
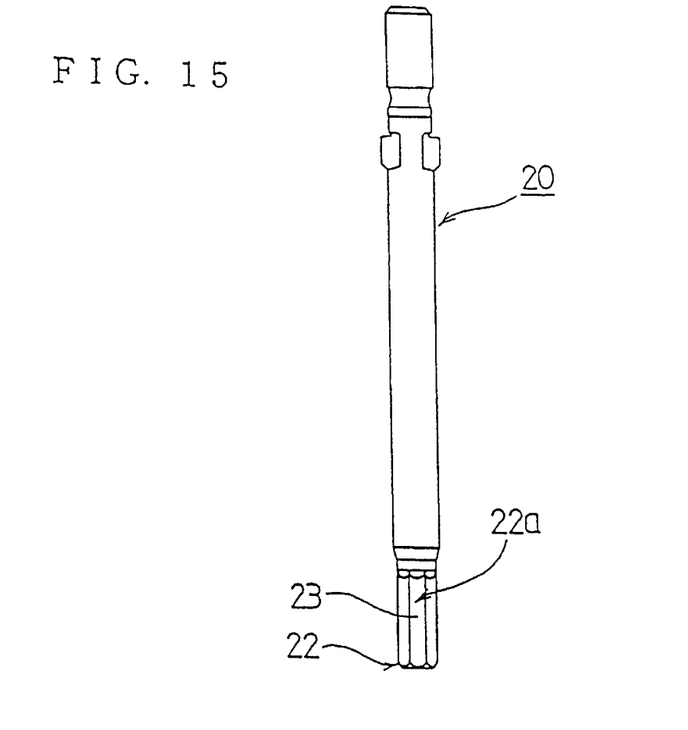
FIG. 15 is a schematic side view of a driver bit for a conventional hexagonal recessed bolt.
Figure 16:
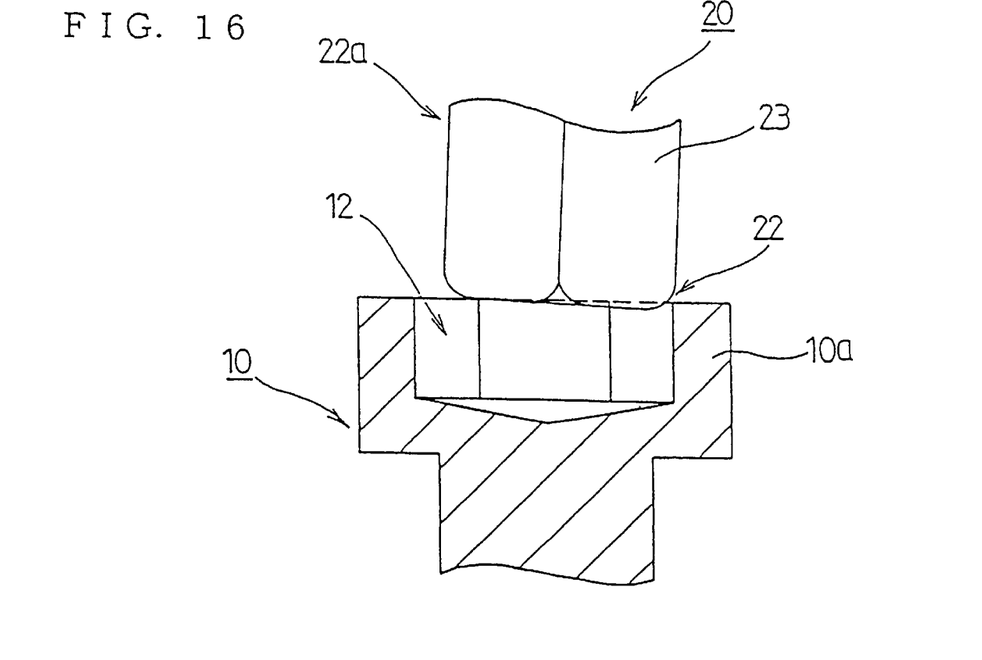
FIG. 16 is a side sectional view of a main portion indicating an abutting condition between the hexagonal recessed bolt indicated in FIG. 13 and the driver bit indicated in FIG. 15.

FIGS. 13 to 16 show constructions of known conventional combinations of hexagonal recessed bolts and driver bits. FIGS. 13 and 14 show a conventional bolt having a hexagonal recess at the center of the bolt head. FIG. 15 illustrates a driver bit for the hexagonal recessed bolt. FIG. 16 depicts how the bolt and the driver bit are engaged.

A conventional bolt 10 shown in FIGS. 13 and 14 is provided with a hexagonal hole 12 at a bolt head 10a. This hexagonal hole 12 is formed so that constant, vertical wall surfaces 13 are respectively formed from the rim-edge toward a bolt neck 10b, and also a substantially conical bottom 14 with a slight slope is formed at the bottom thereof.

On the other hand, a conventional driver bit or wrench 20 in FIG. 15 is constructed to be provided with a hexagonal tip blade 22 which fits the hexagonal hole 12 of the above-mentioned bolt 10, and an appropriately elongated extended blade 22a formed to adapt to the shape of the vertical wall surfaces 13 formed from the rim-edge of the aforesaid hexagonal hole 12 toward the bolt neck 10b. The reference numeral 23 indicates a vertical wall formed on the side face between the above-mentioned tip blade 22 and the extended blade 22a. Namely, it is constructed so that the vertical wall 23 formed on the driver bit or wrench 20 tightly abuts and engages the vertical wall surface 13 formed on the hexagonal hole 12 of the above-described bolt 10.

According to a combination of the conventional bolt and driver bit thus constructed, when the bolt 10 and the driver bit 20 are engaged as shown in FIG. 16, for example, the tip blade 22 and extended blade 22a of the driver bit 20 will respectively fit to the vertical wall surfaces 13 of the hexagonal hole 12; and when the vertical wall 23 of the above-mentioned tip blade 22 and extended blade 22a abuts the vertical wall surface 13 on the hexagonal hole 12 in bolt 10 and the driver bit 20 is rotated, a specified torque can be transmitted to the bolt 10. In other words, it is possible to attach/detach a bolt to/from an object to be bolted.

According to the conventional combination of bolt 10 and driver bit 20 with the configuration as mentioned above, a hexagonal hole 12 in bolt head 10a forms constant, vertical wall surfaces 13 from its opening edge toward the bolt neck 10b. On the other hand, in the driver bit 20 corresponding thereto, an area which is adjacent to each ridgeline from the hexagonal tip blade 22 to the extended blade 22a forms the vertical wall 23 corresponding to the shape of the vertical wall surface 13 on the above-mentioned hexagonal hole 12, as shown in FIG. 16.

Accordingly, in order to fit the blade 22, 22a of driver bit 20 which has the above-mentioned vertical wall 23 forming the hexagonal side-surfaces, to the hexagonal hole 12 in bolt 10 which has the above-mentioned vertical wall side 13 forming the hexagonal side-surfaces, the tip blades 22 of the above-mentioned driver bit 20 is abutted to the opening edge of the hexagonal hole 12 in the above-mentioned bolt 10. However, since length L1, i.e., the length between the symmetrically-opposing ridgelines across the center of hexagonal hole 12, greatly differs from length L2, i.e., the length between vertical wall sides 13, it becomes very difficult to manually match the center of the hexagonal hole 12 in bolt 10 with the center of the tip blade 22 of driver bit 20. (See FIG. 14 (dashed line therein) and FIG. 16.)

In this case, accordingly, if a part of the tip blade 22 of driver bit 20 engagingly abuts a part of the opening edge of the hexagonal hole 12 in the above-mentioned bolt 10, a "come-out" phenomenon, where the tip blade 22 of the above-mentioned driver bit 20 slips out of the opening edge of the hexagonal hole 12 in the above-mentioned bolt 10, may easily occur. When an excess force is applied to the driver bit 20, and when the torque resistance is large, each of the ridgeline portions at the opening edge of the hexagonal hole 12 will gradually be damaged, as illustrated with shaded portion 15 in FIG. 14. If this broken portion (shaded portion 15) gradually expands, the above-described come-out phenomenon of the driver bit 20 will occur frequently, finally making a screwing operation impossible.

From this view point, prevention of the come-out phenomenon for the above-mentioned driver bit 20 requires application of a large pressure against the hexagonal hole 12 when rotating the driver bit 20. No problem will occur when a rigid body, such as metal, is to be bolted or screwed. However, when handling precision parts, if the driver bit 20 comes out of the hexagonal hole 12, there occurs a disadvantageous effect of damage or breaking these precision parts.

Further, occurrence of the above-mentioned come-out phenomenon will accelerate wearing of the bit tip, i.e., tip blade 22 and extended blade 22a. Wearing at these sites will further promote occurrence of the above-mentioned come-out phenomenon. As a result, damages of the hexagonal hole will also increase.

Yet further, it is possible to prevent the come-out phenomenon by applying an excess pressure to the above-mentioned driver bit 20. However, it will be impossible to transmit a precise torque to a bolt, screw, or the like. Also, the amount of pressure applied to the driver bit 20 depends on an operator, resulting in a problem in that the screwing-torque applied to the bolt, screw or the like will vary.

When a bolt or screw is tightened manually, the operation of rotating the driver bit 20 by fully pressing the same against a bolt or screw may be a considerable labor and fatigue to the operator.

According to the conventional combination of bolt 10 and driver bit 20 as mentioned above, especially when an electrical tool is used to fix the screws, upon fitting the hexagonal hole to the bit tip, it is difficult to rotate a bolt while maintaining the bolt axis and the driver bit axis coaxially. When there is a deviation or slant between the bolt axis and the driver bit axis, for example, it is difficult to instantly fit the bit tip of driver bit 20 into the hexagonal hole at the bolt head as shown in FIG. 14 (dashed line therein) and FIG. 16, not only will the above-mentioned come-out phenomenon be caused frequently, but damage of the opening edge of hexagonal hole will also be frequently caused.

When a hexagonal recessed screw is to be detached, the same come-out phenomenon and damage of the opening edge of hexagonal hole may easily occur. In this case, the screw cannot be detached, resulting in such a situation where a part of the object having been screwed has to be destroyed. Such a situation is especially remarkable when dust or the like is filled into the hexagonal hole.

It is an object of the present invention to provide a combination of a screw and a driver bit or wrench capable of: effectively preventing the come-out phenomenon of the driver bit, preventing screws from being damaged which had occurred conventionally, always achieving a proper and prompt screwing operation even if the polygonal hole in the screw is broken, and remarkably improving operation efficiency, by improving the configuration of a polygonal hole in a screw head in a combination of a screw and a driver bit.

DISCLOSURE OF THE INVENTION

In order to achieve the above aims, the screw according to the present invention is a polygonal recessed screw comprising a polygonal recess having a substantially vertical wall surface with a predetermined depth in the central portion of a screw head thereof, and a conical bottom being formed from a lower edge portion of the vertical wall surface towards the central portion of a screw neck; characterized in providing, at the lower edge portion of the vertical wall surface of the polygonal recess formed in said screw head, a vertical stepped portion forming an inscribed circle of the polygon, and forming the conical bottom towards the central portion of the screw neck from the lower edge portion of the vertical stepped portion.

In this case, the polygonal recessed screw can either be constructed by a hexagonal recessed bolt, hexagonal recessed screw, a deformed hexagonal recessed bolt, a deformed hexagonal recessed screw, or other polygonal recessed or deformed polygonal recessed bolts or screws.

Further, a driver bit or a wrench which adapts to the above-described screw according to the present invention is characterized in forming a cylindrical protrusion forming an inscribed circle of a polygon at a tip end of a polygonal tip blade; forming the tip end surface of the cylindrical protrusion into a conical protrusion; and providing an extended blade forming a vertical wall vertically extending from said tip blade.

In this case, the driver bit or the wrench can have its cylindrical protrusion, formed on the tip blade, constructed to have a parallel cylindrical shape forming the inscribed circle of polygon.

Further, the cylindrical protrusion, formed on the tip blade, can be constructed to have, in its side surface at the tip edge forming the inscribed circle of polygon, a curved or a linear cylindrical shape.

Furthermore, a slit with a predetermined length extending in the bit-axis direction from its tip end surface can be constructed in one portion of the cylindrical protrusion formed on the tip blade.

BRIEF DESCRIPTION OF THE DRAWINGS

FIG. 1 shows a hexagonal recessed bolt of one example of a screw according to the present invention; wherein (a) is a side sectional view of a main portion thereof, and (b) is a cross section of the main portion taken along line 1B—1B line in (a);

FIG. 3 shows one example of a driver bit according to the present invention which adapts to the hexagonal recessed bolt indicated in FIG. 1; wherein (a) is a side view of a main portion thereof, (b) is a right side view of (a), and (c) is an end view of a tip end of the bit;

FIG. 8 indicates a constitution example of a wrench according to the present invention; wherein (a) indicates an entire schematic side view, (b) is a left side view of (a), and (c) is a right side view of (a);

FIG. 9 indicates another modified example of a driver bit or a wrench according to the present invention; wherein (a) is a side view of a main portion, and (b) is an end view of a tip end of the bit or an end of the wrench;

BEST MODE FOR CARRYING OUT THE INVENTION

Below, an example of a screw and a driver bit/wrench according to the present invention will be explained in detail with reference to the accompanying drawings.

EXAMPLE 1

Example of Screw

Figures 1A, 1B:
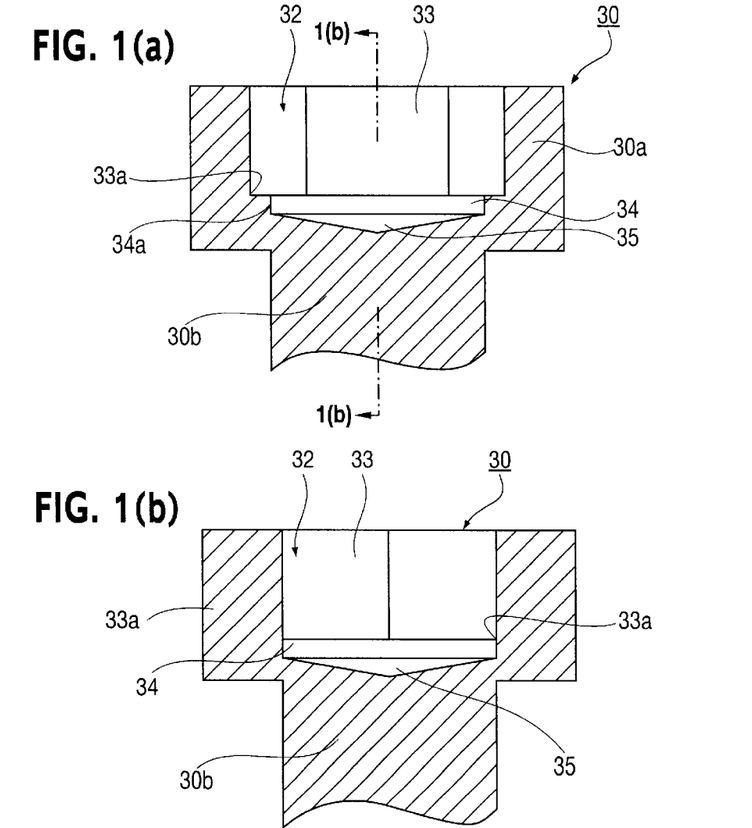
Figure 2:
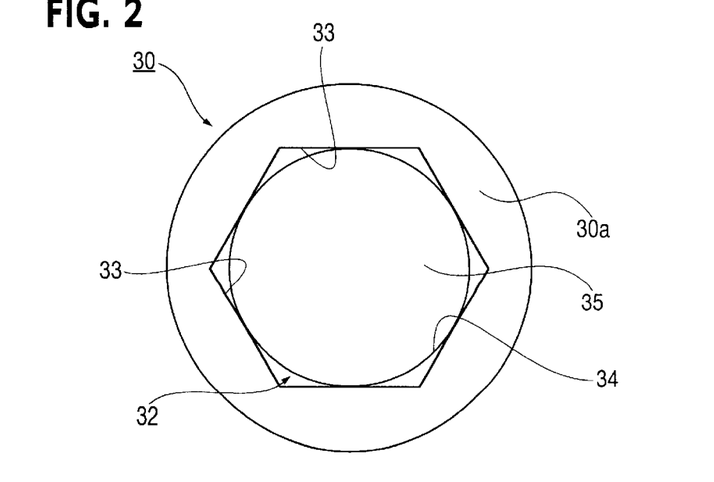
FIG. 2 is a plan of a head portion of hexagonal recessed bolt shown in FIG. 1.

FIG. 1 and FIG. 2 indicate an example of a screw according to the present invention. That is, in FIGS. 1(a) and (b), the reference numeral 30 indicates a hexagonal recessed bolt or screw (hereinafter referred to as "screw") according to the present invention. In a screw head 30a of the screw 30, a hexagonal recess 32 is provided as a bit-fitting recess. This hexagonal recess 32 is provided in a central portion of the screw head 30a.

Yet, the hexagonal recess 32 is constructed by: forming a vertical wall surface 33 at a predetermined depth from its opening edge, providing a vertical stepped portion 34 forming an inscribed circle of a hexagon of the hexagonal recess 32 at a lower edge portion 33a of the vertical wall surface 33, and forming a slightly slanted conical bottom 35 towards a central portion of a screw neck 30b from a lower edge portion 34a of the vertical stepped portion 34.

The vertical wall surfaces 33 are, respectively, formed as substantially vertical walls with a taper of about 1.5° to 2° for disconnection (an angle for disconnection of a heading tool). Accordingly, the vertical wall surface 33 formed in the hexagonal recess 32 of the screw 30 is fitted to a vertical wall of a blade of a driver bit described below.

Example of Driver Bit

FIGS. 3(a), (b) and (c) indicate one example of a driver bit 40 which adapts to the screw 30 according to the present example. That is, the driver bit 40 of the present example is constituted by: being provided with a hexagonal tip blade 42 which appropriately fits the hexagonal recess 32 as a bit-fitting recess of the screw 30, forming a cylindrical protrusion 44 which forms the inscribed circle of hexagon at the tip end of the tip blade 42, forming the tip end surface of the cylindrical protrusion 44 into a conical protrusion 45, and providing an extended blade 42a forming a vertical wall 43 vertically extending from the tip blade 42.

Accordingly, in the driver bit 40, the cylindrical protrusion 44 formed at the tip end of the tip blade 42 is promptly fit and engaged, by the dimension of its inscribed circle, to the opening edge of the hexagonal recess 32 of the screw 30, and then the vertical wall 43 vertically extending from the tip blade 42 coincides with the vertical wall surface 33 of the hexagonal recess 32 of the screw 30 in order for the extended blade 42a to enter into the hexagonal recess 32. Then the cylindrical protrusion 44 fits to the vertical stepped portion 34 of the hexagonal recess 32, and the conical protrusion 45 fits into the conical bottom 35. Thus, the fitting operation between the screw 30 and the driver bit 40 is positively implemented.

Figure 3:
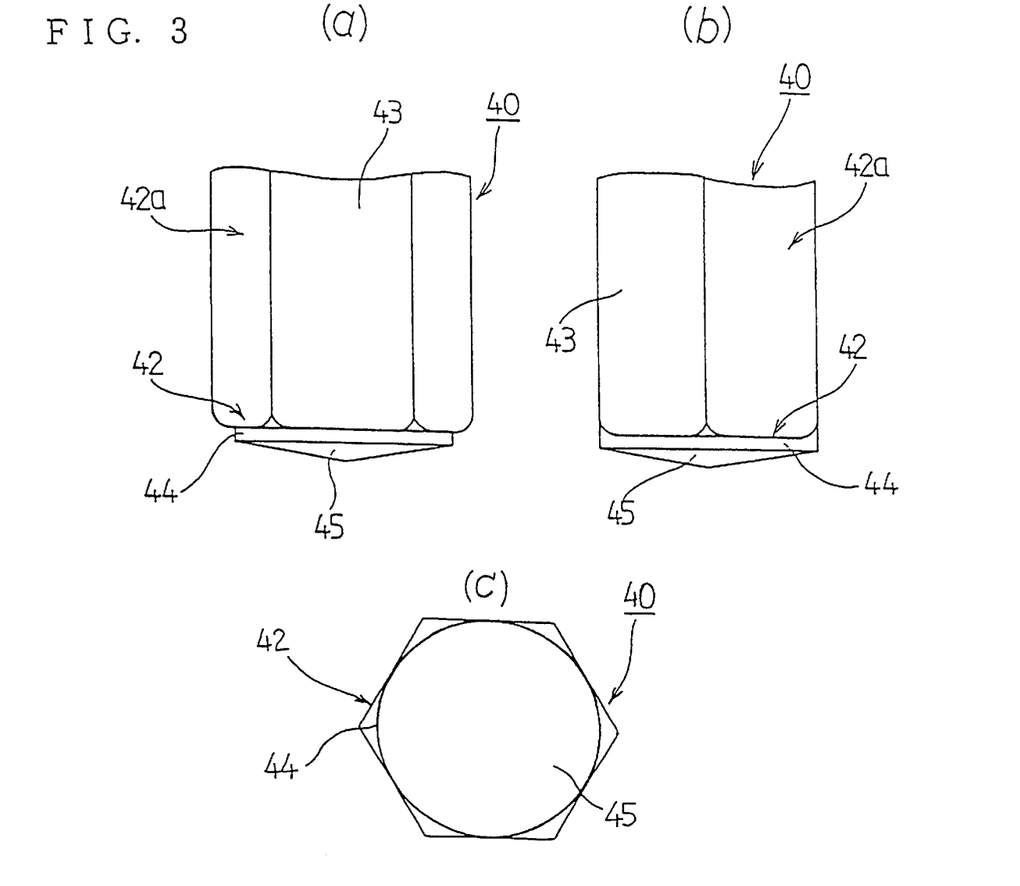
Figure 4:
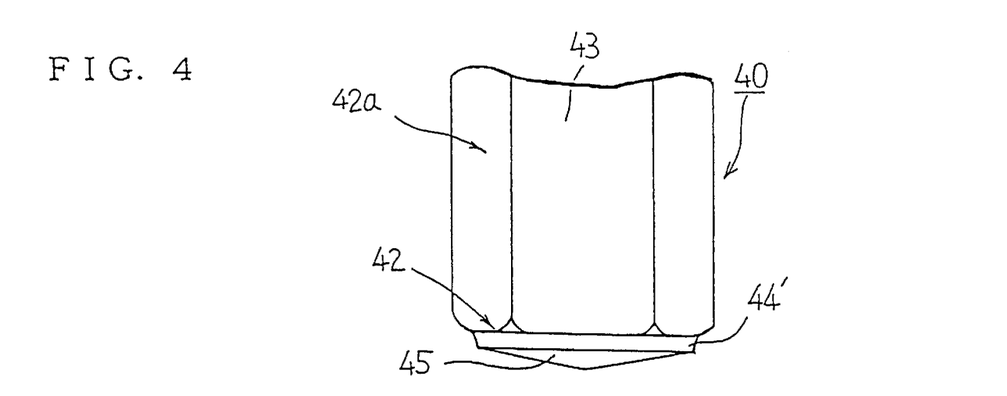
FIG. 4 is a side view of a main portion indicating a modified example of the driver bit indicated in FIG. 3.

FIG. 4 indicates a modified example of the tip blade 42 of the driver bit 40 indicated in FIG. 3. That is, in the example indicated in FIG. 3, a case wherein the cylindrical protrusion 44 of the tip blade 42 is formed in a parallel cylindrical form forming the inscribed circle of hexagon. However it may be have the construction of a cylindrical protrusion 44' wherein its side surface is curved or linear, as indicated in FIG. 4, as long as the tip end forms the inscribed circle of hexagon.

Figure 5:
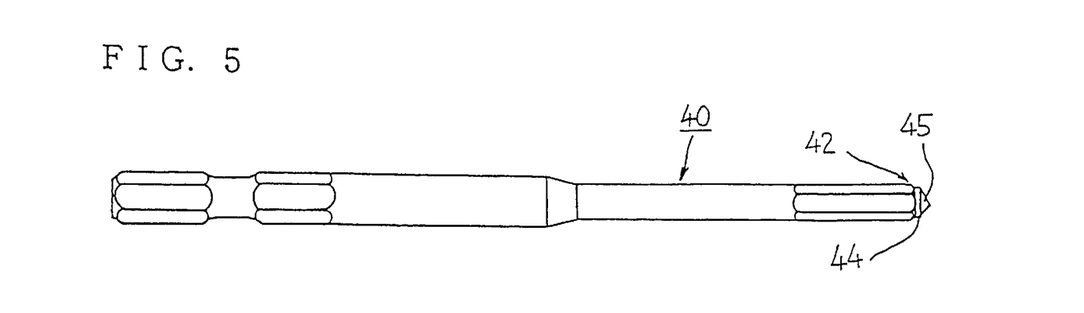
FIG. 5 is a side view indicating an overall constitution example of a driver bit according to the present invention.
Figure 6:
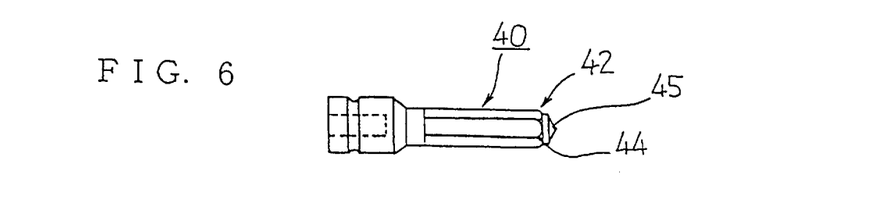
FIG. 6 is a side view indicating an overall constitution example of a socket-type driver bit according to the present invention.

For example, as for a driver bit 40 comprising the thus constructed tip blade 42, it is possible to appropriately use a driver bit 40 with an entire structure as indicated in FIG. 5. Further, it is possible to appropriately use a socket-type driver bit 40 indicated in FIG. 6.

Figure 7:
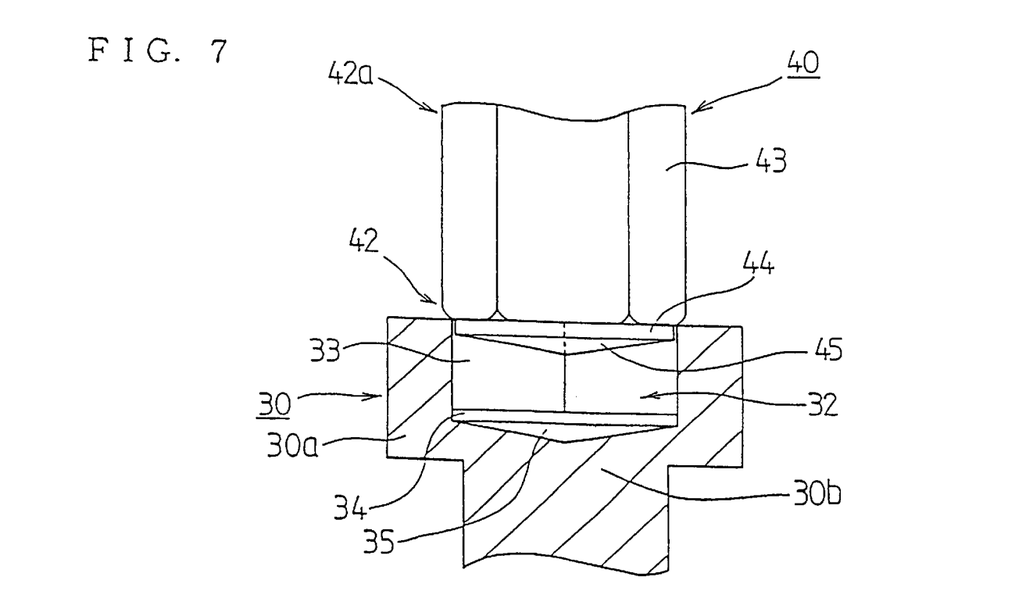
FIG. 7 is a side sectional view of a main portion indicating a condition where the driver bit indicated in FIG. 3 abuts and fits to the hexagonal recessed bolt indicated in FIG. 1.

FIG. 7 indicates a fitting operation between the screw 30 (referring to FIG. 1 and FIG. 2) and the driver bit 40 (referring to FIG. 3) according to the present example.

That is, according to the present example, because of the cylindrical protrusion 44 formed on the tip end of the tip blade 42 of the driver bit 40, upon fitting abutment with the hexagonal recess 32 of the screw 30, the cylindrical protrusion 44 can promptly and positively fit and engage within the inscribed circle of hexagon at the opening edge of the hexagonal recess 32 of the screw 30. Thus, in further operations, it is possible to make the vertical wall surface 33 of the hexagonal recess 32 of the screw 30 immediately coincide with the vertical wall portion 43 vertically extending from the tip blade 42 of the driver bit 40, just by rotating the driver bit 40 in a specific direction. Thus, it is possible to advantageously prevent the come-out phenomenon which occurred from the combination of a conventional screw and driver bit.

Example of Wrench

Figure 8:
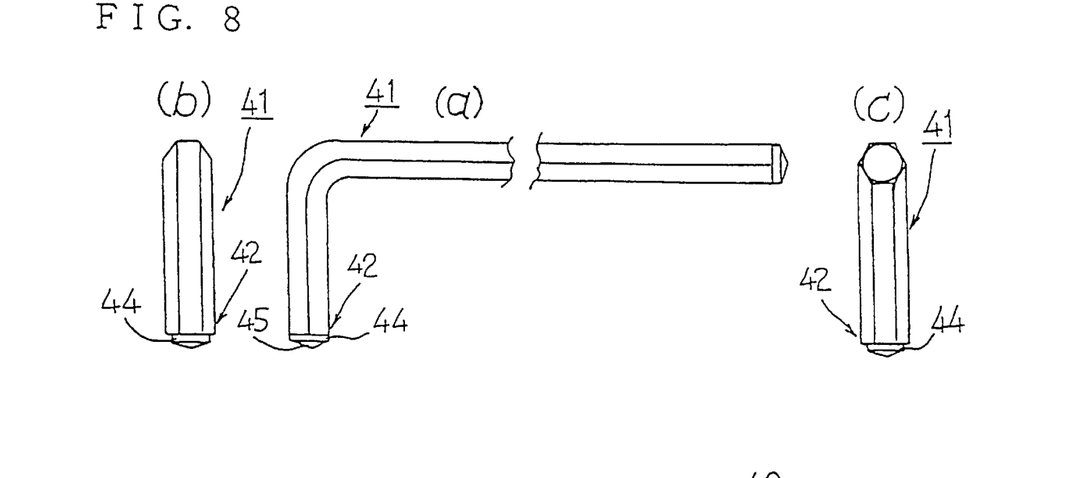

FIG. 8 shows a construction of a wrench 41 instead of the above-described driver bit of the present example. In this case, the construction of the tip blade of the wrench 41 is to have exactly the same construction as the above-described driver bit 40. Thus, the same elements are shown by the same reference numerals, and detailed explanation thereof is omitted. That is, at the tip end of the tip blade 42 of the wrench 41, there is formed a cylindrical protrusion 44; and the tip end surface of the cylindrical protrusion 44 is formed into a conical protrusion 45.

Modified Example of Driver Bit and Wrench

Figure 9:
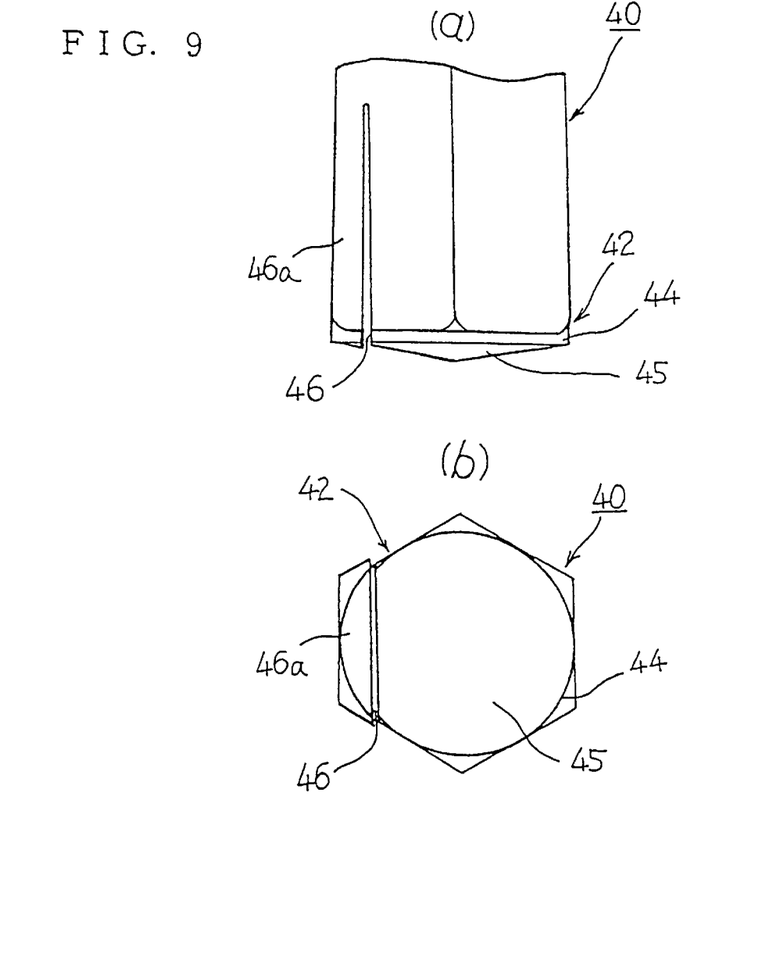

FIGS. 9(a) and (b) indicate another modified example of a tip blade 42 of a driver bit 40 or a wrench 41 according to the present invention. That is, in this case, as indicated in FIGS. 9(a) and (b), it has a construction where, in one portion of the cylindrical protrusion 44 formed on the tip blade 42, there is provided a slit 46 having a predetermined length and extending from the tip end surface in the bit-axis direction from its tip end surface. By so-providing the slit 46 in the tip blade 42, there is formed a blade strip 46a which causes an elastic displacement in the radial direction from the center of the axis of the driver bit 40 or the wrench 41. According to the effect of this blade strip 46a, it is possible to readily achieve holding upon binding with the bit-fitting recess (hexagonal recess 32) of the screw 30.

EXAMPLE 2

Figure 10:
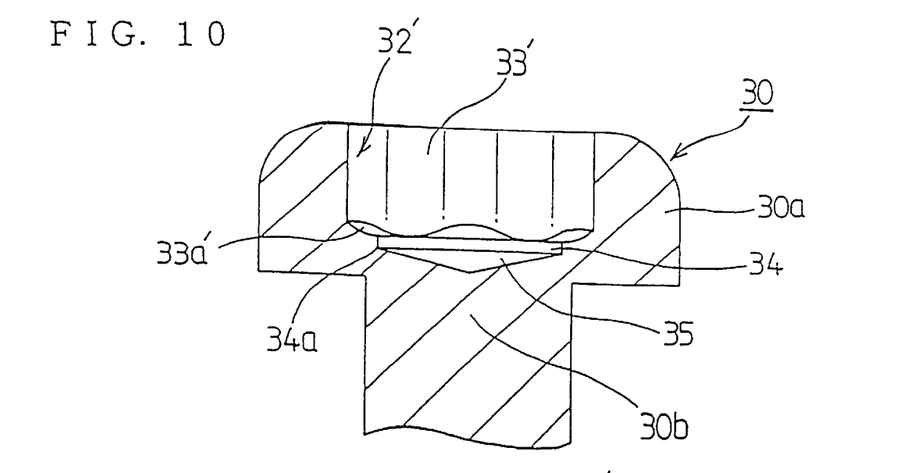
FIG. 10 is side sectional view of a main portion of a deformed hexagonal recessed screw of another example of a screw according to the present invention.
Figure 11:
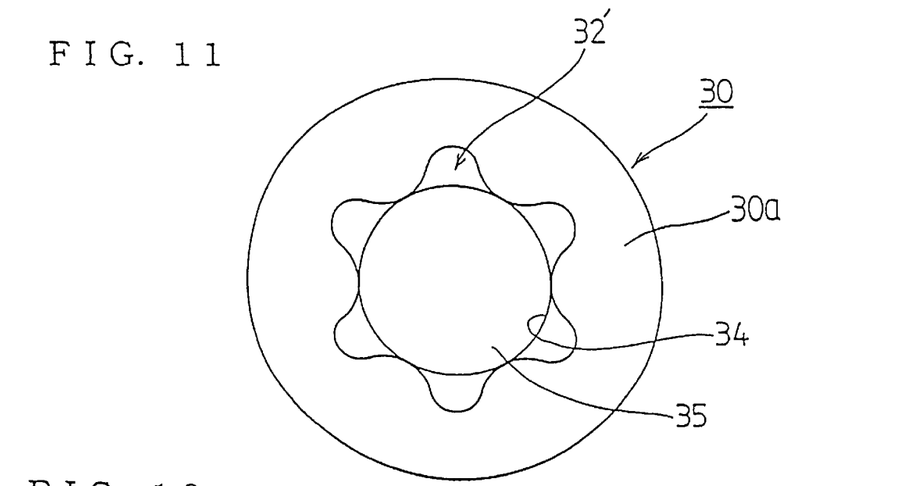
FIG. 11 is a plan of a head portion of a deformed hexagonal recessed screw indicated in FIG. 10.
Figure 12:
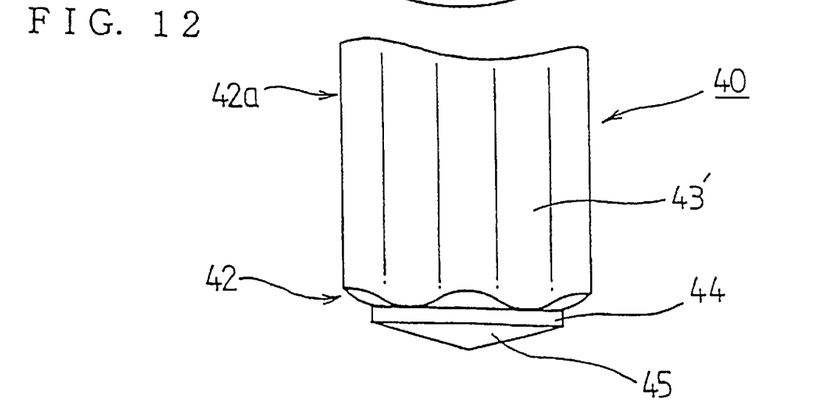
FIG. 12 is a side view of a main portion of a driver bit according to the present invention which adapts to the deformed hexagonal recessed screw indicated in FIG. 10.

FIGS. 10 through 12 indicate a modified example of the screw 30 and driver bit 40 indicated in FIGS. 1 through 3. In the examples indicated in FIGS. 10 through 12, for the sake of brevity of explanation, description will be made by using the same reference numerals for the same elements as in the examples indicated in FIGS. 1 through 3.

That is, the present example indicates a deformed hexagonal recess screw 30 which, as a bit-fitting recess formed in a screw head 30a, has a deformed hexagonal recess 32' that curvingly projects in six directions spaced at even degrees in the radial direction; and a driver bit 40 which adapts to such a screw 31.

Example of Screw

FIG. 10 and FIG. 11 indicate the deformed hexagonal recess screw 30 of the present example. That is, the above described deformed hexagonal recess 32' is constructed by: forming a curved vertical wall surface 33' at a predetermined depth from its opening edge, providing a vertical stepped portion 34 forming an inscribed circle of a deformed hexagon of the deformed hexagonal recess 32' at a lower edge portion 33a' of the vertical wall surface 33', and forming a slightly slanted conical bottom 35 towards a central portion of a screw neck 30b from the lower edge portion 34a of the vertical stepped portion 34.

Example of Driver Bit

FIG. 12 indicates one example of a driver bit 40 which adapts to the screw 30 according to the aforesaid example. That is, the driver bit 40 of the present example is constituted by: being provided with a deformed hexagonal tip blade 42 which appropriately fits the deformed hexagonal recess 32', as a bit-fitting recess, of the screw 30, forming a cylindrical protrusion 44 forming an inscribed circle of the modified hexagon at the tip end of the tip blade 42, forming the tip end surface of the cylindrical protrusion 44 into a conical protrusion 45, and providing an extended blade 42a forming a vertical wall 43' vertically extending from the tip blade 42 and curving in the circumferential direction.

Even when combining the so-structured screw 30 and driver bit 40 of the present example, alike the above-described example, because of the cylindrical protrusion 44 formed on the tip end of the tip blade 42 of the driver bit 40, upon the fitting abutment with the deformed hexagonal recess 32' of the screw 30, the cylindrical protrusion 44 can promptly and positively fit and engage within the inscribed circle of the modified hexagon at the opening edge of the deformed hexagonal recess 32' of the screw 30. As a result, it is possible to advantageously prevent the come-out phenomenon.

Further, in the present example, it is possible to appropriately use a similar type wrench (referring to FIG. 8) instead of the above-described driver bit.

The preferred examples of the present invention have been described above. However, the present invention is not to be limited to the hexagonal recessed bolt and screw, or to its deformed ones in the aforesaid examples, but it is possible to be appropriately used in various polygonal recessed bolts and screws and in its deformed ones, and, as a matter of course, it is possible to make various modifications in design as long as it is within a scope that does not depart from the spirit of the present invention.

As is clear from the above-described examples, according to the screw of the present invention, which is a polygonal recessed screw comprising a polygonal recess having a substantially vertical wall surface with a predetermined depth in the central portion of its screw head, and a conical bottom being formed from a lower edge portion of the vertical wall surface towards the central portion of a screw neck, characterized in providing, at the lower edge portion of the vertical wall surface of the polygonal recess formed in said screw head, a vertical stepped portion forming an inscribed circle of the polygon, and forming the conical bottom towards the central portion of the screw neck from a lower edge portion of the vertical stepped portion, it is possible to positively prevent the come-out phenomenon of a driver bit.

On the other hand, by constructing the driver bit or the wrench according to the present invention by forming a cylindrical protrusion forming an inscribed circle of a polygon at a tip end of a polygonal tip blade; forming the tip end surface of the cylindrical protrusion into a conical protrusion; and providing an extended blade forming a vertical wall vertically extending from said tip blade, it is possible to obtain a most adaptable means for the above-described screw.

The screw according to the present invention does not only have a general versatility for being advantageously used with conventional driver bits or wrenches, but is also superior in strength considering its construction, and has an advantage in enhancing its utilization value.

Further, according to the driver bit of the present invention, it is possible to easily and promptly achieve the positioning to the central position of the bit-fitting recess of the screw, and equalize the abutment to the rotation-drive surface of the screw. Thus, there can be obtained many superior advantages such as that, when applied to automatic machines, damage to the screws can be reduced, and workability upon screwing operation can be considerably enhanced.

Furthermore, in the present invention, it is possible to produce the screws conveniently and at low cost through mass production by using a heading tool comprising a protrusion strip or protrusion streak which adapts to the shape of the bit-fitting recess of the above-described screw.

What is claimed is:
1. A fastener comprising:
 a fastener head;
 a polygonal recess having a substantially vertical wall surface with a predetermined depth in a central portion of the fastener head;
 a vertical stepped portion forming an inscribed circle touching the polygonal recess at a lower edge portion of the substantially vertical wall surface of the polygonal recess; and
 a conical bottom extending from a lower edge portion of the vertical stepped portion toward a central portion of a fastener neck.
2. The fastener according to claim 1, wherein the polygonal recess is a hexagonal recess.
3. The fastener according to claim 1, wherein the polygonal recess is a deformed hexagonal recess.
4. The fastener according to claim 1, wherein the fastener is a screw.
5. The fastener according to claim 1, wherein the fastener is a bolt.
6. A combination comprising:
 a fastener comprising:
 a fastener head;
 a polygonal recess having a substantially vertical wall surface with a predetermined depth in a central portion of the fastener head;
 a vertical stepped portion forming an inscribed circle touching the polygonal recess at a lower edge portion of the substantially vertical wall surface of the polygonal recess; and
 a conical bottom extending from a lower edge portion of the vertical stepped portion toward a central portion of a fastener neck; and
 a device for operating the fastener comprising:
 a polygonal tip blade sized to fit the polygonal recess of the fastener;
 an extended blade forming a vertical wall vertically extending from the polygonal tip blade, the vertical wall being configured to engage the substantially vertical wall surface of the polygonal recess;
 a cylindrical protrusion forming an inscribed circle touching the polygonal tip blade at a tip end of the polygonal tip blade, the cylindrical protrusion being sized to fit the vertical stepped portion of the fastener; and
 a conical protrusion extending from a tip end surface of the cylindrical protrusion, the conical protrusion being sized to fit the conical bottom of the fastener.
7. The combination according to claim 6, wherein the cylindrical protrusion of the device has a parallel cylindrical shape forming the inscribed circle of the polygonal tip blade.
8. The combination according to claim 6, wherein the cylindrical protrusion of the device has, in a side surface thereof at a tip edge forming the inscribed circle of the polygonal blade, a curved cylindrical shape.
9. The combination according to claim 6, wherein the cylindrical protrusion of the device has, in a side surface thereof at a tip edge forming the inscribed circle of the polygonal blade, a linear cylindrical shape.
10. The combination according to claims 6, 7, 8, or 9, wherein the device further comprises a slit formed in one portion of the cylindrical protrusion, the slit extending a predetermined length vertically from the tip end surface of the cylindrical protrusion.

11. The combination according to claim 6, wherein the device is a driver bit.

12. The combination according to claim 6, wherein the device is a wrench.

13. A device for operating a fastener comprising:
   a polygonal tip blade;
   an extended blade forming a vertical wall vertically extending from the polygonal tip blade;
   a cylindrical protrusion forming an inscribed circle touching the polygonal tip blade at a tip end of the polygonal tip blade; and
   a conical protrusion extending from a tip end surface of the cylindrical protrusion.

14. The device according to claim 13, wherein the cylindrical protrusion has a parallel cylindrical shape forming the inscribed circle of the polygonal tip blade.

15. The device according to claim 13, wherein the cylindrical protrusion has, in a side surface thereof at a tip edge forming the inscribed circle of the polygonal blade, a curved cylindrical shape.

16. The device according to claim 13, wherein the cylindrical protrusion has, in a side surface thereof at a tip edge forming the inscribed circle of the polygonal blade, a linear cylindrical shape.

17. The device according to claims 13, 14, 15, or 16, further comprising a slit formed in one portion of the cylindrical protrusion, the slit extending a predetermined length vertically from the tip end surface of the cylindrical protrusion.

18. The device according to claim 13, wherein the device is a driver bit.

19. The device according to claim 13, wherein the device is a wrench.

* * * * *

UNITED STATES PATENT AND TRADEMARK OFFICE
CERTIFICATE OF CORRECTION

PATENT NO. : 6,393,953 B1
DATED : May 28, 2002
INVENTOR(S) : Totsu

It is certified that error appears in the above-identified patent and that said Letters Patent is hereby corrected as shown below:

Column 8,
Lines 56-58, change "has, in a side surface thereof at a tip edge forming the inscribed circle of the polygonal blade, a curved cylindrical shape" to -- has a curved side surface --.
Lines 60-62, change "has, in a side surface thereof at a tip edge forming the inscribed circle of the polygonal blade, a linear cylindrical shape" to -- has a linear side surface --.

Column 9, line 18 - Column 10, line 2,
Change "has, in a side surface thereof at a tip edge forming the inscribed circle of the polygonal blade, a curved cylindrical shape" to -- has a curved side surface --.

Column 10,
Lines 4-6, change "has, in a side surface thereof at a tip edge forming the inscribed circle of the polygonal blade, a linear cylindrical shape" to -- has a linear side surface --.

Signed and Sealed this

Thirteenth Day of August, 2002

Attest:

Attesting Officer

JAMES E. ROGAN
*Director of the United States Patent and Trademark Office*